(12) United States Patent
Taylor et al.

(10) Patent No.: US 7,532,771 B2
(45) Date of Patent: May 12, 2009

(54) IMAGE PROCESSING SYSTEM FOR DIGITAL COLLAGE

(75) Inventors: Stuart Taylor, Cambridge (GB);
Carsten Rother, Cambridge (GB);
William H de Boer, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 44 days.

(21) Appl. No.: 11/609,802

(22) Filed: Dec. 12, 2006

(65) Prior Publication Data

US 2007/0110335 A1    May 17, 2007

Related U.S. Application Data

(63) Continuation-in-part of application No. 11/552,312, filed on Oct. 24, 2006, which is a continuation-in-part of application No. 11/213,080, filed on Aug. 26, 2005.

(60) Provisional application No. 60/627,384, filed on Nov. 12, 2004.

(51) Int. Cl.
*G06K 9/36* (2006.01)
(52) U.S. Cl. .................. 382/284; 382/282; 382/294; 358/540; 358/450
(58) Field of Classification Search ............. 382/115, 382/118, 178, 284, 294; 358/537, 540, 450
See application file for complete search history.

(56) References Cited

U.S. PATENT DOCUMENTS

| | | | | |
|---|---|---|---|---|
| 5,568,194 | A * | 10/1996 | Abe | 348/223.1 |
| 5,862,508 | A * | 1/1999 | Nagaya et al. | 701/207 |
| 6,123,362 | A | 9/2000 | Squilla et al. | |
| 6,263,088 | B1 * | 7/2001 | Crabtree et al. | 382/103 |
| 6,320,976 | B1 | 11/2001 | Murthy et al. | |
| 6,396,963 | B2 | 5/2002 | Shaffer et al. | |
| 6,411,742 | B1 | 6/2002 | Peterson | |
| 6,663,732 | B1 | 12/2003 | Link | |
| 6,798,903 | B2 * | 9/2004 | Takaoka | 382/167 |
| 6,850,252 | B1 * | 2/2005 | Hoffberg | 715/716 |

(Continued)

FOREIGN PATENT DOCUMENTS

JP    2000043363    2/2000

(Continued)

OTHER PUBLICATIONS

Agarwala, A et al. "Interactive Digital Photomontage", ACM Trans Graph. 23, 3, (2004), pp. 1-9.

(Continued)

*Primary Examiner*—Yosef Kassa
(74) *Attorney, Agent, or Firm*—Lee & Hayes, PLLC

(57) ABSTRACT

It is required to provide a framework for an automated process for forming a visually appealing collage from a plurality of input images. It is required to provide a framework for this type of automated process which is flexible and robust and which can easily be interfaced to a related software application. An image synthesis framework is provided with a modular architecture having a first module, a plurality of prior compute modules and an image synthesis module. The first module provides an application programming interface, the prior compute modules compute information about input images, and the image synthesis module uses the computed information together with the input images to form a digital collage.

20 Claims, 11 Drawing Sheets

U.S. PATENT DOCUMENTS

| | | | |
|---|---|---|---|
| 6,919,892 B1 * | 7/2005 | Cheiky et al. | 345/473 |
| 6,999,095 B2 | 2/2006 | Wang et al. | |
| 7,027,054 B1 * | 4/2006 | Cheiky et al. | 345/473 |
| 7,057,650 B1 | 6/2006 | Sakamoto | |
| 7,058,252 B2 * | 6/2006 | Woodgate et al. | 385/16 |
| 7,085,435 B2 | 8/2006 | Takiguchi et al. | |
| 7,096,426 B1 | 8/2006 | Lin-Hendel | |
| 7,098,914 B1 | 8/2006 | Katayama et al. | |
| 7,181,017 B1 * | 2/2007 | Nagel et al. | 380/282 |
| 7,308,133 B2 * | 12/2007 | Gutta et al. | 382/159 |
| 2003/0095720 A1 | 5/2003 | Chiu et al. | |
| 2004/0161224 A1 | 8/2004 | Yamazoe et al. | |
| 2005/0016244 A1 | 1/2005 | Hergemoller | |
| 2005/0044485 A1 | 2/2005 | Mondry et al. | |
| 2005/0062841 A1 | 3/2005 | Rivera-Cintron | |
| 2006/0061598 A1 | 3/2006 | Mino et al. | |
| 2006/0062455 A1 | 3/2006 | Chiu et al. | |
| 2006/0062456 A1 | 3/2006 | Chiu et al. | |
| 2006/0104542 A1 | 5/2006 | Blake et al. | |
| 2006/0140455 A1 | 6/2006 | Costache et al. | |

FOREIGN PATENT DOCUMENTS

| | | |
|---|---|---|
| WO | WO2006/079991 | 8/2006 |

OTHER PUBLICATIONS

Chen, J-Y, "Hierarchical Browsing and Search of Large Image Databases", IEEE Transactions on Image Processing, vol. 9, No. 3, (Mar. 2000), pp. 1-15.

Diakopoulos, N. et al., "Mediating Photo Collage Authoring", (Oct. 2005), pp. 183-186.

Efros, A. A. et al. "Image Quilting for Texture Synthesis and Transfer". Proc. ACM Siggraph, (2001), pp. 341-346.

Gemmell, J et al. "My LifeBits: Fulfilling the Memex Vision", Proceedings ACM Multimedia 2002, 10th International Conference on Multimedia, Juan-les-Pins, France, Dec. 1-6, 2002 ACM International Multimedia Conference New York: AMC, US, vol. conf 10, (Dec. 2002), pp. 1-4.

Gemmell, J et al. "Telling Stories with Mylifebits", Multimedia and Expo 2005, ICME 2005, IEEE International Conference on Amsterdam, The Netherlands (Jul. 2005), pp. 1-4.

iView MediaPro User Manual, iView Multimedia Ltd, London, GB, (Jul. 2002), pp. 1-58.

Krishnamachari, S. "Image Browsing using Hierarchical Clustering", Computers and Communications, 1999. Proceedings IEEE International Symposium on Red Sea, Egypt Jul. 6-8, 1999, Los Alamitos, CA, USA, IEEE Comput. Soc. USA, Jul. 6, 1999, pp. 301-307.

Kwatra, V. et al. "Graphcut Textures: Images and Video Synthesis Using Graph Cuts". ACM Trans Graph. 22, 3, 227-286, (2003), pp. 1-10.

Ma, Y et al. "Video Snapshot: A Bird View of Video Sequence", Multimedia Modelling Conference, 2004, MMM 2005, Proceedings of the 11th International Honolulu, HI, USA, Jan. 12-14, 2005, Piscataway, NJ, USA, IEEE Jan. 12, 2005, pp. 1-8.

Parker, E. "Virtual Reality". WESCON/96 Anaheim, CA, USA, Oct. 22-24, 1996, New York, NY, USA, IEEE, US Oct. 22, 1996, pp. 542-546.

Perez, P. et al. "Poisson Image Editing". ACM Trans. Graph. 22, 3, 313-318, (2003).

Rother, Carsten et al., "Digital Tapestry", retrieved on Dec. 12, 2006, <<http://research.microsoft.com/~carrot/publicatons_files/paper_DigitalTapestry_CVPR05.pdf>>, 8 pages.

Wang, J. et al. "Picture Collage", Proceedings of the 2006 IEEE Computer Society Conference on Computer Vision and Pattern Recognition, pp. 1-8.

Boykov, et al., "Fast Approximate Energy Minimization via Graph Cuts", p. 8.

Carson, et al., "Blobworld: Image Segmentation Using Expectation-Maximization And Its Application To Image Querying", p. 16.

Fitzgibbon, et al., "On Affine Invariant Clustering and Automatic Cast Listing in Movies", p. 17.

Jojic, et al., "Epitomic Analysis Of Appearance And Shape", at <<http://www.research.microsoft.com/~jojic>>, ICCV, 2003, p. 10.

Kolmogorov, et al., "Computing Visual Correspondence with Occlusions using Graphs Cuts", Computer Science Department Cornell University, p. 37.

Kolmogorov, et al., "Multi-camera Scene Reconstruction via Graph Cuts", Computer Science Department Cornell University, p. 16.

Kolmogorov, et al., "What Energy Functions can be Minimized via Graph Cuts?", Computer Science Department Cornell University, p. 17.

Rother, et al., "AutoCollage", p. 6.

Swain, et al., "Color Indexing", Kluwer Academic Publishers, 1991, pp. 11-32.

Uyttendaele, et al., "Eliminating Ghosting And Exposure Artifacts In Image Mosaics", p. 8.

Viola, et al., "Rapid Object Detection Using A Boosted Cascade Of Simple Features", CVPR, 2001, p. 9.

Zhu, et al., "Filters, Random Field and Maximum Entropy (FRAME): Towards a Unified Theory for Texture Modeling", Kluwer Academic Publishers, 1998, pp. 107-126.

PCT International Search Report dated Apr. 30, 2008 from corresponding PCT Application No. PCT/US2007/087318, 3 pages.

* cited by examiner

A

B

C

IMAGE PROCESSING SYSTEM FOR DIGITAL COLLAGE

CROSS-REFERENCE TO RELATED APPLICATION(S)

This application is a continuation-in-part application from U.S. application Ser. No. 11/552,312 filed on 24 Oct. 2006 entitled "Auto Collage" which is expressly incorporated herein by reference. U.S. patent application Ser. No. 11/552,312 is itself a continuation-in-part application from U.S. patent application Ser. No. 11/213,080 filed on 26 Aug. 2005 entitled "Image Tapestry", which is also expressly incorporated herein by reference. U.S. patent application Ser. No. 11/213,080 is itself a full utility filing of U.S. provisional application No. 60/627,384 which was filed on 12 Nov. 2004 and which is also expressly incorporated herein by reference.

TECHNICAL FIELD

This description relates generally to image processing for creating digital collage, also known as digital tapestry and photomontage, from a plurality of digital images.

BACKGROUND

It is required to provide a framework for an automated process for forming a visually appealing collage from a plurality of input images. Forming such a collage is a difficult problem especially as the number of input images increases and when it is required to produce a collage that acts as a type of visual image summary which is appealing to the viewer. In addition, it is difficult to provide a framework for this type of automated process which is flexible and robust and which can easily be interfaced to a related software application.

Manual methods of generating an image tapestry or image collage are known. For example, by manually segmenting and combining a collection of consumer photographs. These photographs may be manually cropped and combined to form a manually generated tapestry such as by using commercial image editing software. However, this is time consuming and requires significant skill and knowledge on the part of the user.

Previous automated approaches have relied on using images to be assembled that are already broadly compatible, by being approximately matched along the seams. Only adjustment of the seams is then required to make the seams invisible. However, it is required to use images that may not already be broadly compatible.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

It is required to provide a framework for an automated process for forming a visually appealing collage from a plurality of input images. It is required to provide a framework for this type of automated process which is flexible and robust and which can easily be interfaced to a related software application. An image synthesis framework is provided with a modular architecture having a first module, a plurality of prior compute modules and an image synthesis module. The first module provides an application programming interface, the prior compute modules compute information about input images, and the image synthesis module uses the computed information together with the input images to form a digital collage.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for producing collages from digital photographs, the system described is provided as an example and not a limitation. As those skilled in the art will appreciate, the present examples are suitable for application in a variety of different types of selection and/or labeling systems using any types of digital image such as stills from videos, medical images, UV images, IR images or any other suitable type of image.

Figure 1:
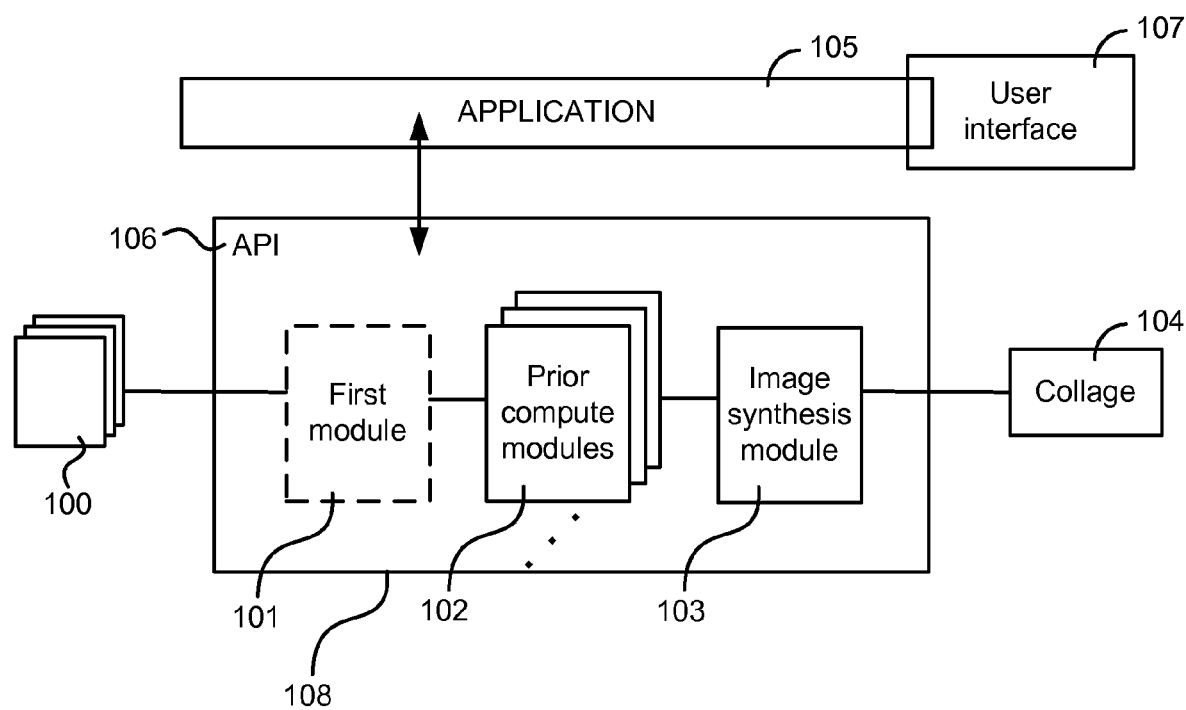
FIG. 1 is a schematic diagram of an image synthesis framework interfaced to a software application.

FIG. 1 is a schematic diagram of an image synthesis framework 108. The framework 108 is provided as a software framework or in any other suitable form and comprises a plurality of modules. The framework 108 receives input images 100 in any suitable form and produces a digital collage image 104 from all or some of the input images 100. The input images and the output digital collage image may be of any suitable form, including but not limited to JPEG, BMP, GIF, and PNG. The input images may comprise alpha information is an alpha channel is present and may be of any image color depth from monochrome to 32-bit for example. The size of the output digital collage image may be controlled to be of any width and height.

For example, the plurality of input images 100 may be a collection being a personal data set of about 50 photographs of an event such as a holiday. The photographs may be of different sizes and may be different from one another in that they are not already approximately matched along seams for joining. For example, some of the photographs may be taken at night and some during day light. Others may be of landscapes whereas others may be portraits of people. By forming a collage, a single image is produced which is an amalgam of parts of some or all of the input images. The collage thus acts as a type of visual summary of the input images, for example, to summarize images of a family holiday. It is not essential for the plurality of input images to be related to one another such as by all being from a particular event.

The collage may remind the user of the collection of input images, e.g. as a "thumbnail" of the image collection. In some cases, the collage may act as an image retrieval system. For example, a user may select one or more portions of the collage, and the collage system may retrieve one or more images having similar image characteristics, may retrieve the input image(s) providing the depicted image in the selected region, and the like.

The image synthesis framework 108 comprises a first module 101 having an application programming interface (API) 106 which may be public and which is arranged to enable interfacing to one or more software applications 105. The first module 101 is shown in FIG. 1 with a dotted line to indicate that it is integrated with the API 106. The image synthesis framework 108 also comprises one or more prior compute modules 102 and an image synthesis module 103. One or more of the first module 101, prior compute modules 102 and image synthesis module 103 may be provided as dynamic link libraries. These modules may be provided in any suitable format. The prior compute modules 102 and the image synthesis module 103 each have a private interface to the first module 101 with integrated public API 106. Thus the prior compute modules 102 and image synthesis modules are controlled via the first module 101 with integrated public API 106.

The image synthesis framework 108 thus comprises a modular architecture as a result of the modules 101, 102, 103 and this enables different instances of the processing modules to be loaded and configured at runtime. The image synthesis framework provides a data processing pipeline, with one or more images 100 acting as input, and a single synthesized image 104 being the output. Control of the pipeline is achieved through calls to the public API 106.

The first module 101 and integrated API 106 provide functionality to load, configure and run the plug-in modules such as prior compute modules 102 and image synthesis module 103. The first module 101 also provides functionality to load and unload input images 100 and to create associated data structures for these. This module is arranged to rank the input images 100 and also to compute a region of interest (RoI) for one or more of the input images. In addition it provides ability to save output images 104.

The prior compute modules 102 provide functionality to compute prior information for the input images 100 based on factors such as saliency and face detection. This is described in more detail below.

The image synthesis module 103 provides functionality to form a digital collage from the input images and the prior compute results. This is achieved in any suitable manner.

The software application 105 may provide a user interface 107 for controlling and/or viewing the process carried out by the image synthesis framework 108. This user interface and software application 105 are provided in any suitable manner using any suitable programming language and interface to the image synthesis framework using the public API 106.

Figure 2:
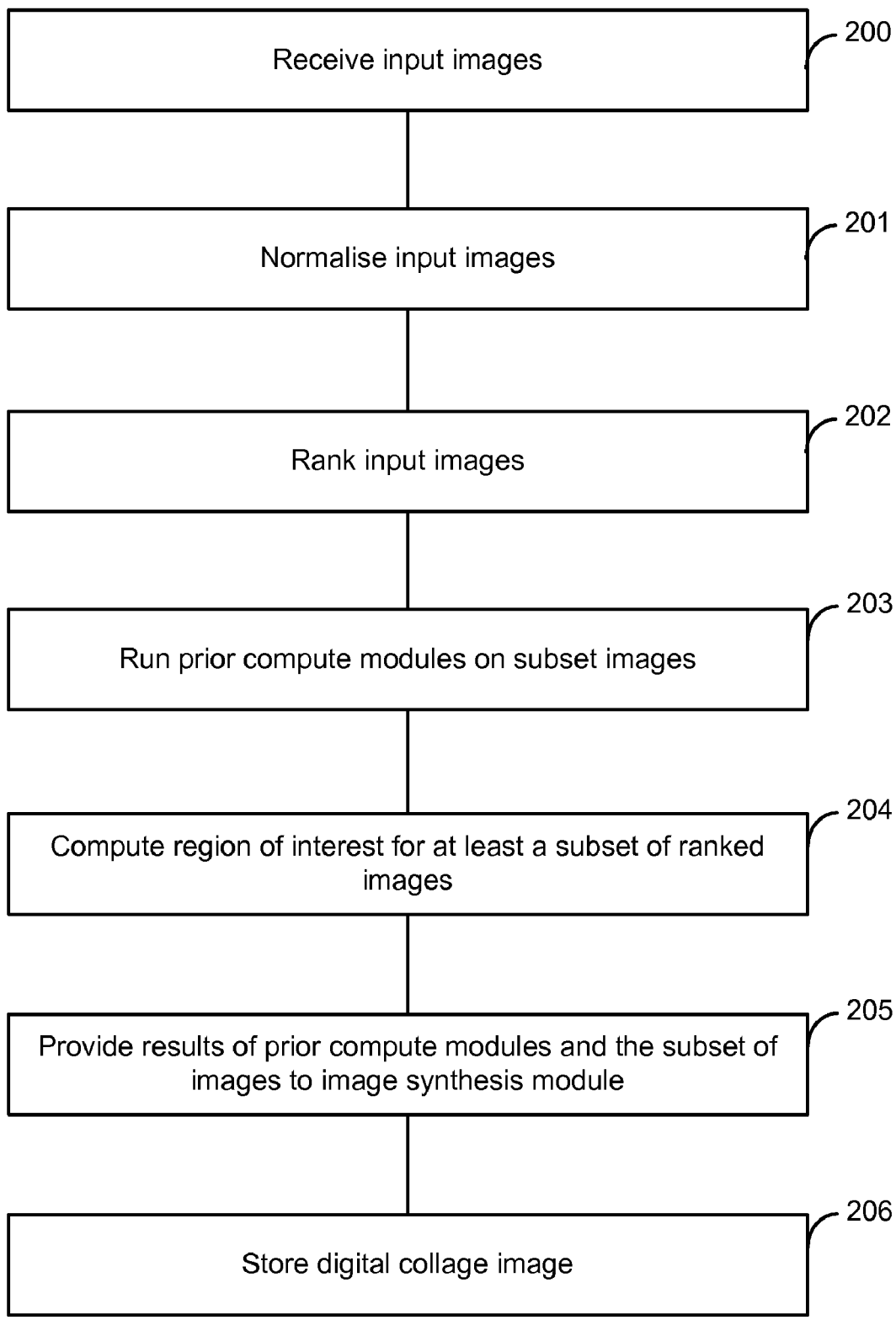
FIG. 2 is a flow diagram of a method of forming a digital collage using an image synthesis framework.

A data flow example through the image synthesis framework 108 is now described with reference to FIG. 2. Information flow starts with a collection of images 100 which are fed (box 200) into the framework 108. Each input image 100 is normalized (box 201) for example by being downscaled to match predetermined dimensions and to ensure dimensions do not vary considerably across input images 100. For example, input images are represented as a 24-bit bitmap image, which is stored as a temporary file on disk. However, this is not essential, any suitable representation format for the input images may be used. The normalized input images are ranked (box 202) in any suitable manner. Examples of image ranking methods are described in more detail below.

By normalizing the input images the processing time required is reduced for some or all of the stages in production of the synthesized image. For example, the processing required for image ranking, region of interest computation, prior compute module processing and image synthesis module processing is reduced by using image normalization to reduce the amount of data that is to be processed. It is thus beneficial to reduce the dimensions of the input images as much as possible during normalization. The resulting synthesized image may then be scaled up to user specified dimensions. However, it is not essential to provide normalization of the input images.

A subset of the ranked, normalized images, such as the first n normalized images, are then fed into the next stage which comprises using prior compute modules (box 203) Those prior compute modules which have been selected for use in this instantiation of the image synthesis framework are then run on the subset of normalized images (box 203). Each prior compute module extracts a specified type of information from an image such as information about faces in the image or a saliency map. This extracted information may be represented as a matrix that optionally has the same dimensions as the associated normalized image. By using a generic representation such as this matrix representation, it is possible to make the prior compute and image synthesis modules pluggable, that is; easily interchanged, removed and/or replaced.

A region of interest is then computed for one or more of the normalized input images (box 204). This region of interest computation process may be called as necessary internally by the image synthesis module. The region of interest computation process may use results from one or more of the prior compute modules.

The results of the prior compute modules and the subset of normalized images are provided to the image synthesis module (box 205) which forms a digital collage. That digital collage is then stored (box 206). The image synthesis module 103 takes as input the matrix representations computed by the prior compute modules and the normalized images themselves. For example, it works with the same normalized images that were fed into the prior compute modules. This module may also take as input one or more of the input images before those images have been normalized. These original input images may be used when scaling up the synthesized image to user specified dimensions. This module is preferably also pluggable. It always expects a plurality of normalized images and their associated prior matrices (or other prior compute module output) as input. It generates a single image as output. For example, the output image is generated by processing the normalized input images and their prior matrices, taking parts of an image depending on a user definable weighted combination of the prior matrices and putting it in a certain place in the output image. The output image may then be post-processed and optionally scaled-up to user specified dimensions.

Figure 3:
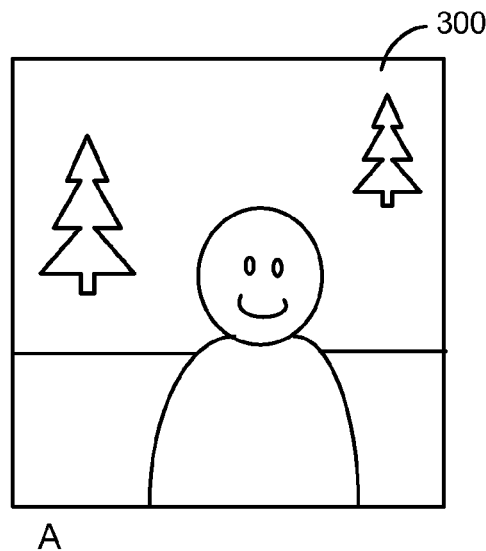
FIG. 3A is a schematic diagram of an input image.
FIG. 3B is a schematic diagram of the input image of FIG. 3A with a region of interest shown.
FIG. 3C is a schematic diagram of a prior matrix obtained from the input image of FIG. 3A.
Figure 3:
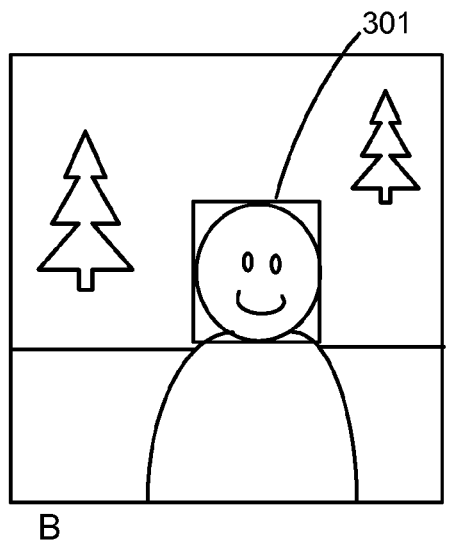
Figure 3:
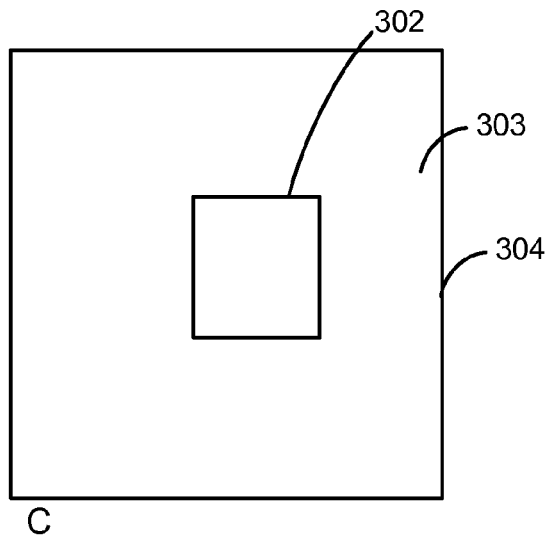

FIG. 3A is a schematic diagram of a normalized input image 300 and FIG. 3B shows this same normalized input image with a region of interest 301 detected. This region of interest is detected in any suitable manner as described in more detail below. FIG. 3C is a schematic diagram of a prior matrix 304 obtained from the normalized input image of FIG. 3A. Suppose that the prior matrix is used to store the results of a face detection process. This prior matrix has the same dimensions as the input image (although this is not essential) and values in the matrix at locations corresponding to the region of interest 302 are given the same specified value (such as 1 for example) because these relate to image elements where a face is detected. Values in the matrix at other locations 303 are given a different same specified value (such as 0 for example).

Each prior matrix comprises a 2D array of image blocks where an image block is a single pixel or a group of pixels such as 32×32 pixels or another size. The prior compute modules populate such a matrix with information about an input image. For example, a prior compute module that identifies faces within an image may mark high potential values in a matrix at positions where a face is found and low values elsewhere.

In one example, a prior compute module is arranged to fill a potential matrix with a Gaussian distribution of potential values. This module may then be used to differentially weight information in an image according to its location. For example, where most important information in an image is contained towards the centre, this prior compute module is able to weight the image information accordingly.

In another example, a prior compute module is arranged to fill a potential matrix with contrast values calculated from corresponding areas of an input image.

In another example, a prior compute module identifies one or more faces within an input image and marks the corresponding values within a potential matrix.

By using the same matrix representation for the results of each of the prior compute modules it is possible to interchange and/or use different combinations of prior compute modules. In addition the weight given to the results of each prior compute module may quickly and easily be differentially adjusted. For example, in one embodiment a software application 105, FIG. 1 is arranged to provide a user interface 107 which provides a graphical display of check boxes and sliders. The check boxes are arranged to allow selection of prior compute modules to be used and the sliders are arranged to set the relative weight to be given to the results of those selected prior compute modules in the image synthesis process. In this way user control is given to obtain different results depending on the prior compute modules selected and the chosen relative weights. Any suitable user interface items may be used in place of the check boxes and sliders.

Figure 4:
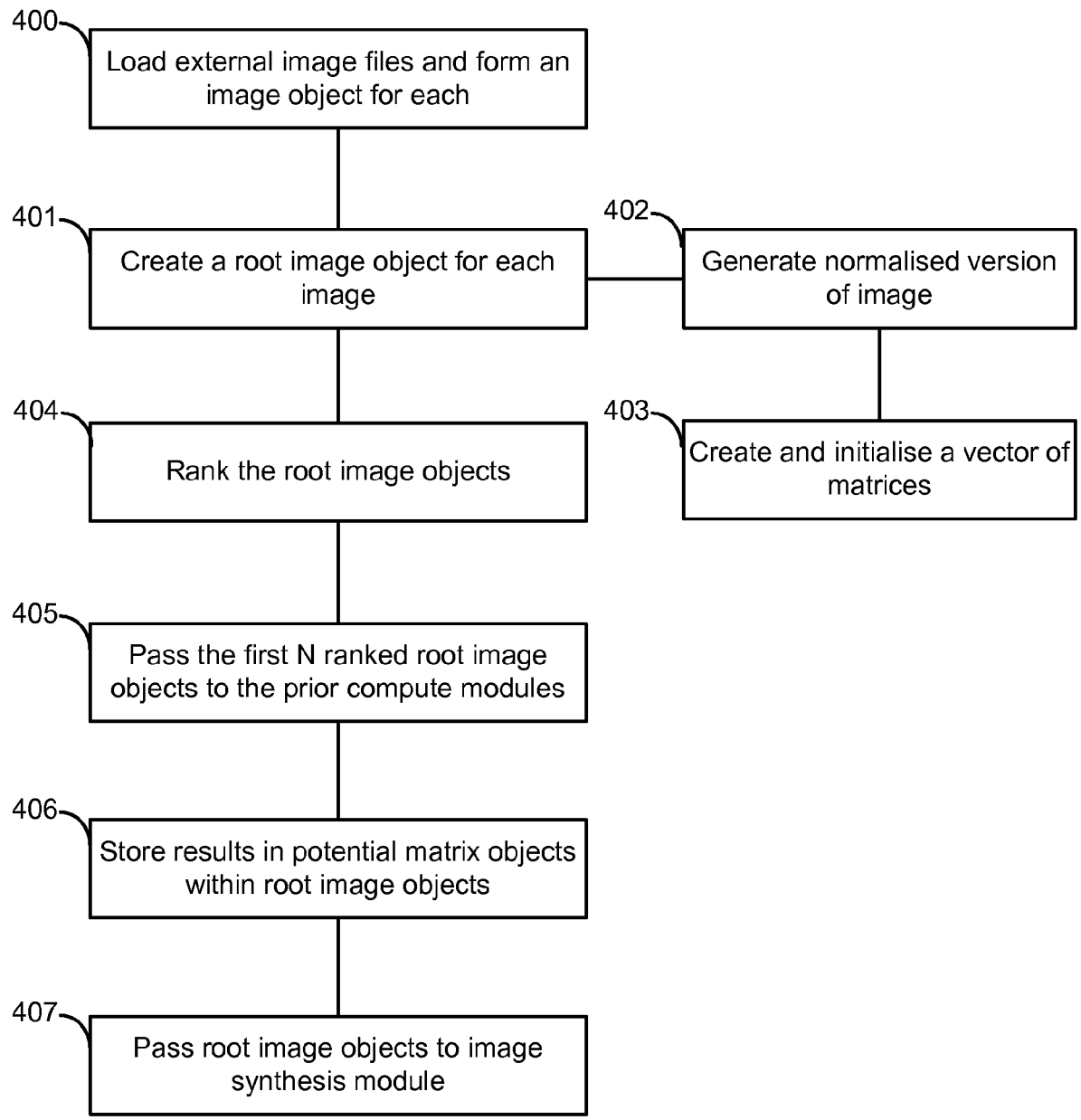
FIG. 4 is a flow diagram of a method of using an image synthesis framework.

In an example, the image synthesis framework is provided using an object oriented programming language although this is not essential. A method of using an example of the image synthesis framework provided using an object oriented programming language is now described with reference to FIG. 4. External image files (being the input images 100) are loaded. The resultant image is returned as an image object (box 400).

For each input image a root image object is created (box 401) an initialized. As part of this process a normalized version of the image is generated (box 402) and a vector of potential matrices is created (box 403) and initialized (the size of the vector of matrices may be equal to the number of prior compute modules to be used). The root image objects are then ranked (box 401) in any suitable manner. For example, these are ranked according to specified quality (unary) and dissimilarity (binary) metrics and are ordered according to this ranking. The first N ranked root image objects are then passed to each of the prior compute modules (box 405). The prior compute modules perform the required computation on the normalized image stored within the root image objects. The resultant data is stored (box 406) in a potential matrix object which may also be contained within the root image object. The root image objects are then passed to the image synthesis module (box 407) which generates the final synthesized output image.

As mentioned above the image synthesis framework (ISF) comprises a public API. In other words, the ISF exposes a set of public API functions that may be used by a software application or other entity to control the image synthesis process. An example of suitable functions for this public API is now given. These are provided by way of example only; other combinations of similar functions may also be used.

| Function Name | Description |
| --- | --- |
| ISFInit | The ISFInit function initializes a new instance of the ISF, and if successful, returns a handle which is then passed to all other ISF API functions. |
| ISFDeInit | The ISFDeInit function is used to deinitialize the specified instance of the ISF, cleaning up and freeing any allocated resources. |
| ISFGetISFInfo | The ISFGetISFInfo function is used to return information about the ISF module currently in use. |
| ISFFreeISFInfo | The ISFFreeISFInfo function is used to free the ISF_INFO structure returned by ISFGetISFInfo. |
| ISFGetState | The ISFGetState function is used to return the current state of the specified ISF instance. |
| ISFLoadConfigFile | Given the full path and filename of the configuration file, ISFLoadConfigFile loads the specified file, and then loads and initializes the modules listed in the file. |
| ISFSaveConfigFile | Given the full path and name of an XML configuration file, ISFSaveConfigFile saves the current ISF module configuration to the specified file. |
| ISFLoadPriorModule | Given the path and name of the module, ISFLoadPriorModule loads and initializes the specified PriorCompute module. This function will fail and return E_LOADMODULE if the same module is loaded more than once. |
| ISFLoadSynthModule | Given the path and name of the module, ISFLoadSynthModule loads and initializes the specified ImageSynth module. Each time this function is called, the previously |

-continued

| Function Name | Description |
| --- | --- |
|  | loaded ImageSynth module (if one exists) will be unloaded, and the newly specified one will be loaded and used. |
| ISFGetPriorInfo | This function is used to return information about the currently loaded PriorCompute modules. Note that ISFFreePriorInfo should be called after a call to this function to ensure that the vector of module information is correctly freed. |
| ISFFreePriorInfo | This function is used to free the vector of module information returned by the ISFGetPriorInfo function. |
| ISFSetPriorInfo | This function is used to configure a previously loaded PriorCompute module, including enabling/disabling them and setting the weighting. |
| ISFGetSynthInfo | This function is used to return information about the currently loaded ImageSynth module. |
| ISFFreeSynthInfo | This function is used to free the information returned by the ISFGetSynthInfo function. |
| ISFSetSynthInfo | This function is used to set the specified synthesis information. |
| ISFSetNormalizationInfo | Used to specify how the image normalization should be carried out. |
| ISFSetRankingInfo | Used to specify the parameters used in ranking. |
| ISFLoadImage | Load the specified input image, normalize it and create the corresponding CRootImage object. |
| ISFUnloadImage | Unload the specified image and free the corresponding CRootImage object. |
| ISFUnloadAllImages | Unload all images and free the corresponding CRootImage objects. |
| ISFSetBackgroundImage | Specifies which of the input images should be used as the background image during the image synthesis process. |
| ISFSetPriorStatusCallback | This function is used to set the prior callback function. The callback is called periodically after ISFRunPriorComputes has been called, and is used, for example, to provide processing progress to the user. |
| ISFSetSynthStatusCallback | This function is used to set the synth callback function. The callback is called periodically after ISFRunSynthImage has been called, and is used, for example, to provide processing progress to the user. |
| ISFSetRankingStatusCallback | This function is used to set the ranking callback function. The callback is called periodically after ISFRunImageRanking has been called, and is used to provide processing progress to the user. |
| ISFRunPriorComputes | This function runs the currently loaded (and enabled) PriorCompute modules. If a callback has been installed (via a call to ISFSetPriorStatusCallback) this will be called during the prior computations. Note that there is only a single PriorCompute callback, which gives status information about the overall computation process for all PriorCompute modules and all images. |
| ISFRunImageRanking | This function runs the image ranking. If a callback has been installed (via a call to ISFSetRankingStatusCallback) this will be called during the ranking computations. |
| ISFGetRankingResults | This function is used to obtain the results of the ranking calculations. |
| ISFFreeRankingResults | This function is used to free the ranking results that were obtained from ISFGetRankingResults. |
| ISFMoveImageToRank | This function moves an image to a specific spot within the ranks, overriding the rank it was given by the ranking obtained by ISFRunImageRanking. |
| ISFGetPriorResults | This function is used to obtain the results of the PriorCompute calculations (for all currently loaded PriorCompute modules) for the specified image. |
| ISFFreePriorResults | This function is used to free the vector of PriorCompute results obtained after calling ISFGetPriorResults. |
| ISFSetPriorResults | This function is used to set (update) the PriorCompute results for a particular image. |
| ISFGetROIInfo | This function returns information about the image's Region of Interest that is calculated by the framework. |
| ISFSetROI | This function allows the user to set or modify a particular image's Region of Interest. |
| ISFRunSynthImage | This function runs the currently loaded ImageSynth module. |
| ISFPause | This function can be called following a call to either ISFRunPriorComputes or ISFRunSynthImage to pause the current processing operation. |
| ISFResume | This function should be called following a call to ISFPause to resume the current processing operation. |
| ISFStop | This function is used to stop (cancel) either the PriorCompute or ImageSynth processing operation. |
| ISFSaveSynthImage | Saves the synthesized image to the specified file. |
| ISFGetSynthImage | Return the synthesized image. |
| ISFFreeSynthImage | Free the synthesized image returned by ISFGetSynthImage. |

Figure 5:
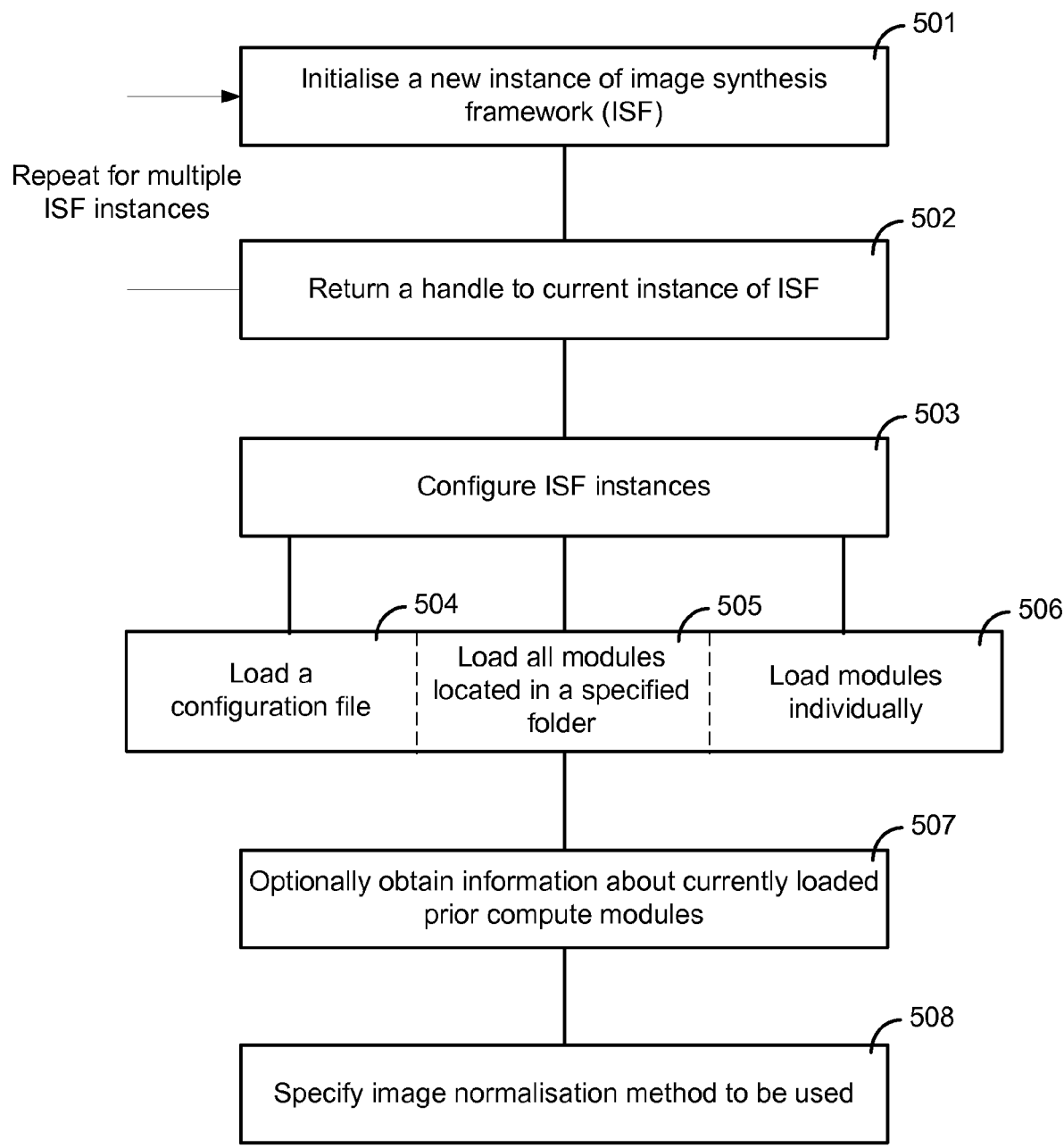
FIG. 5 is a flow diagram of a method of initializing an image synthesis framework, configuring that framework and specifying a normalization method.

FIG. 5 is a flow diagram of a method for initializing and configuring an instantiation of an ISF. A new instance of an ISF may be initialized (box 501) by calling ISFInit. Upon success, this function returns a handle (box 502) to the current instance of the ISF. This handle may then be passed as a first parameter to all other ISF API functions. Each time ISFInit is called, it returns a unique handle, thus allowing multiple instances of the ISF to be instantiated. When an instance of the ISF is no longer required, a call to ISFDeInit may be made, which frees any allocated resources.

The ISF may be configured (box 503) in a number of ways. Configuration comprises telling the ISF which prior compute and image synthesis modules to load. Configuration may be achieved using any of the following methods either individually, or in combination:

by calling ISFLoadConfigFile to have the ISF load a configuration file the specifies which plug-in modules to load (box 504);

by having the ISF load all of the modules located in a specified folder by calling ISFLoadModuleFolder (box 505);

by having the ISF load the modules individually through calls to ISFLoadModule (box 506).

At this stage an optional call to ISFGetPriorInfo may be made (box 507). This returns a vector of pointers to structures which may be used to enable or disable individual prior compute modules and control the weighting given to the prior compute results. A call to ISFGetPriorInfo may be matched with a call to ISFFreePriorInfo to ensure that module information is freed.

The image normalization method to be used is specified (box 508) for example using ISFSetNormalizationInfo.

Figure 6:
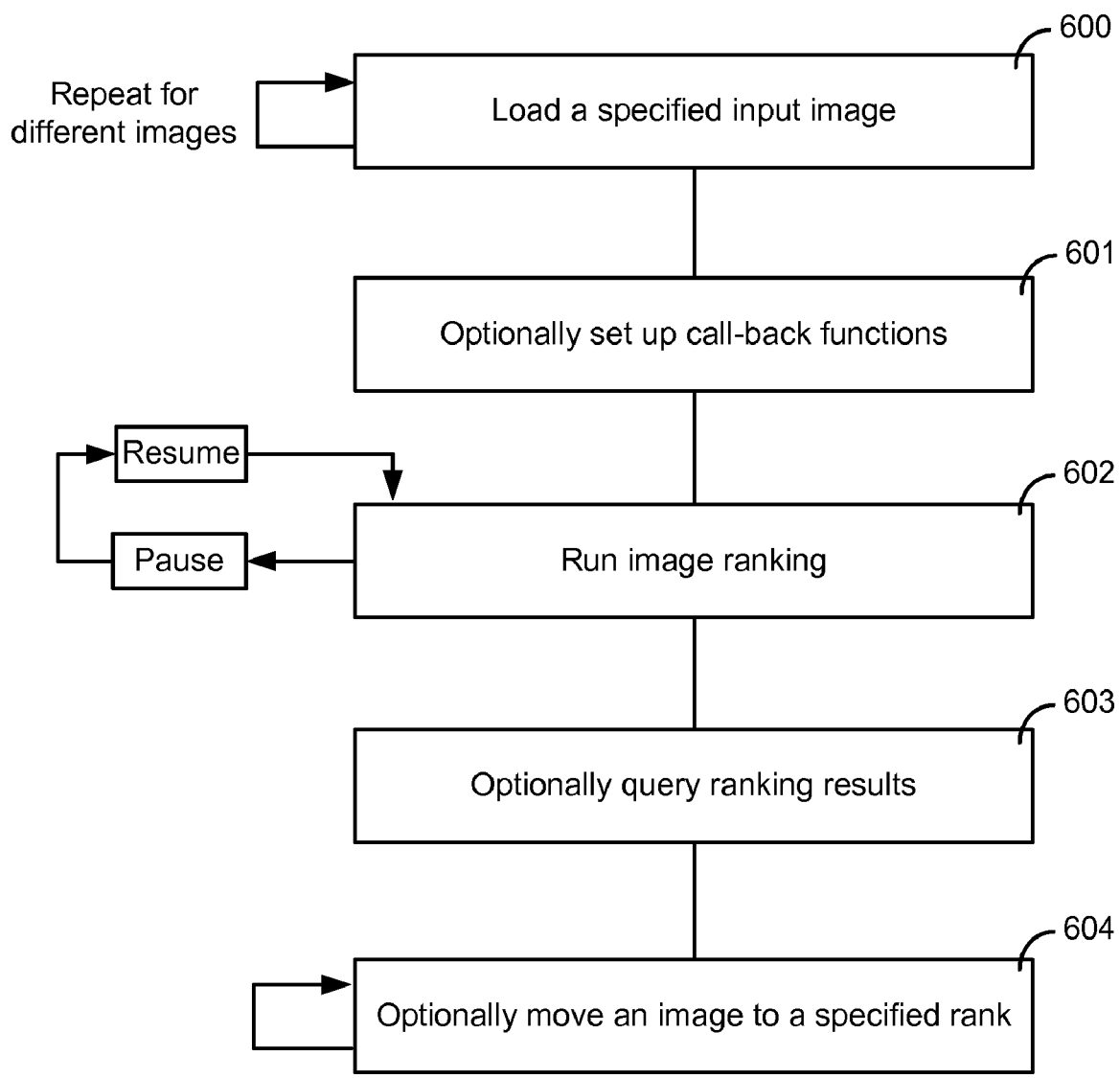
FIG. 6 is a flow diagram of a method of ranking input images using an image synthesis framework.

FIG. 6 is a flow diagram of a method of loading input images and running image ranking. Once the ISF has been initialized and configured calls to ISFLoadImage may be made which causes the ISF to load specified images (box 600). This function may be called multiple times to allow a set of input images to be loaded. Images may be unloaded at any point during which the framework is not busy processing by calling ISFUnloadAllImages or ISFUnloadImage to unload all images or just a particular image.

If required call-back functions may be set up (box 601). For example, calls to ISFSetPriorStatusCallback, ISFSetRankingStatusCallback and ISFSetSynthStatusCallback may be made. This installs callback functions that are called during the ranking, prior compute and image synthesis processing stages. The callback function receives progress information about the processing operations, and may be used to display progress information to a user, for example. The progress information is of any suitable type. For example, it comprises a number between 0 and 100 where 100 serves to announce that the particular stage has finished processing.

Image ranking is next carried out (box 602) for example, by making a call to ISFRunImageRanking. The results may be queried (box 603) by calling ISFGetRankingResults and a subsequent call to ISFFreeRankingResults may be made once the results are no longer required. A user may move an image to a specified rank by calling ISFMoveImageToRank (box 604). The ranking process may optionally be paused and resumed as indicated in FIG. 6.

Figure 7:
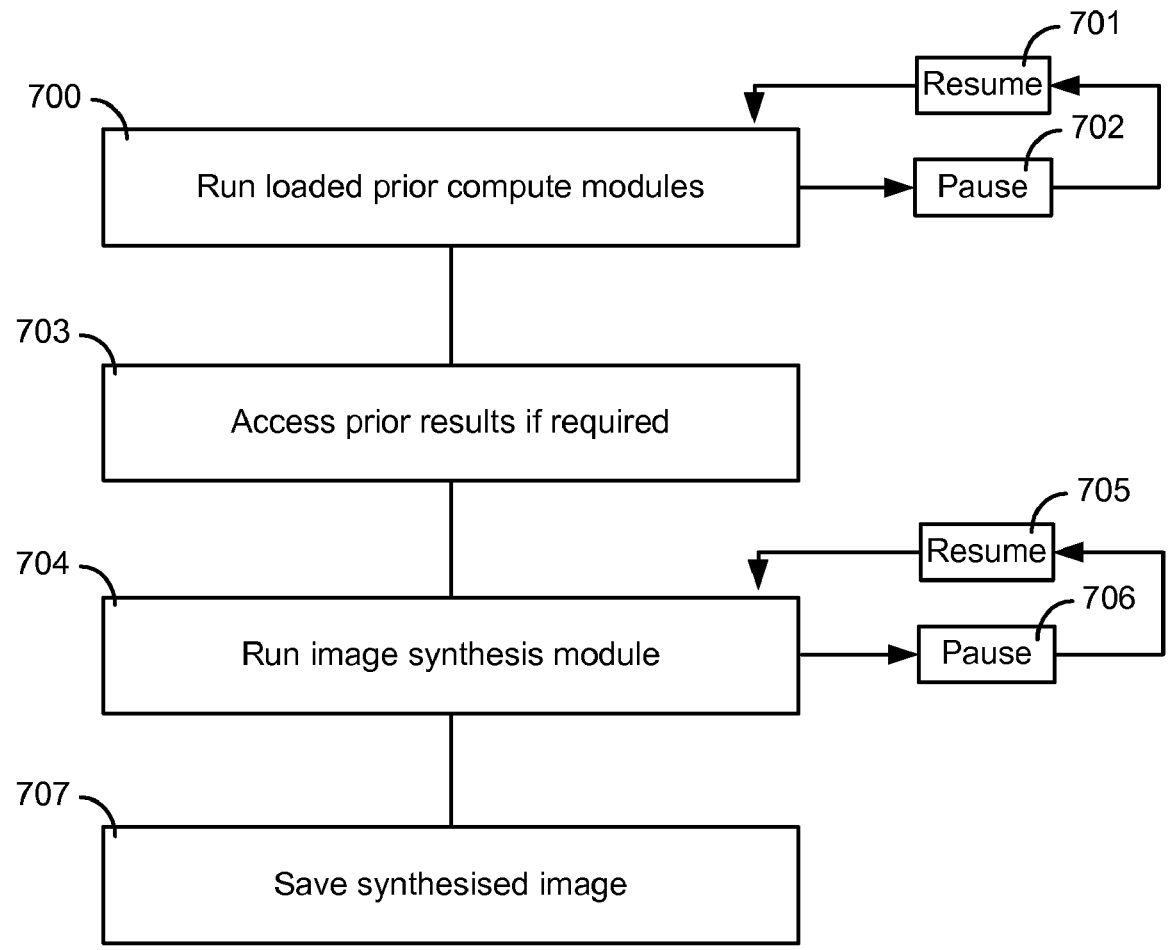
FIG. 7 is a flow diagram of a method of performing prior computation and image synthesis using an image synthesis framework.

FIG. 7 is a flow diagram of a method of running prior compute modules and synthesizing an image. The loaded prior compute modules are run (box 700) for example, by making a call to ISFRunPriorComputes and this process may be paused (box 702) and resumed (box 701). The prior results for any of the input images may be obtained through a call to ISFGetPriorResults (box 703). Once these results are no longer required a call to ISFFreePriorResults may be made. Once the prior compute results have been obtained the image synthesis module may be run (box 704) for example, by making a call to ISFRunSynthImage. The synthesis process may be paused (box 706) and resumed (box 705). The synthesized image may be saved (box 707) for example by calling ISFSaveSynthImage. It may be returned in memory as a BITMAPINFOHEADER and pointer to the image data via a call to ISFGetSynthImage.

Each instance of the ISF maintains an internal state variable in some examples. Depending on the current state, some API functions may return an error code. This indicates that the current state prohibits the particular function call being made. For example, it is required to ensure that all modules are loaded before input image loading takes place. A call to ISFGetState may be made at any time to determine the current state.

Figure 8:
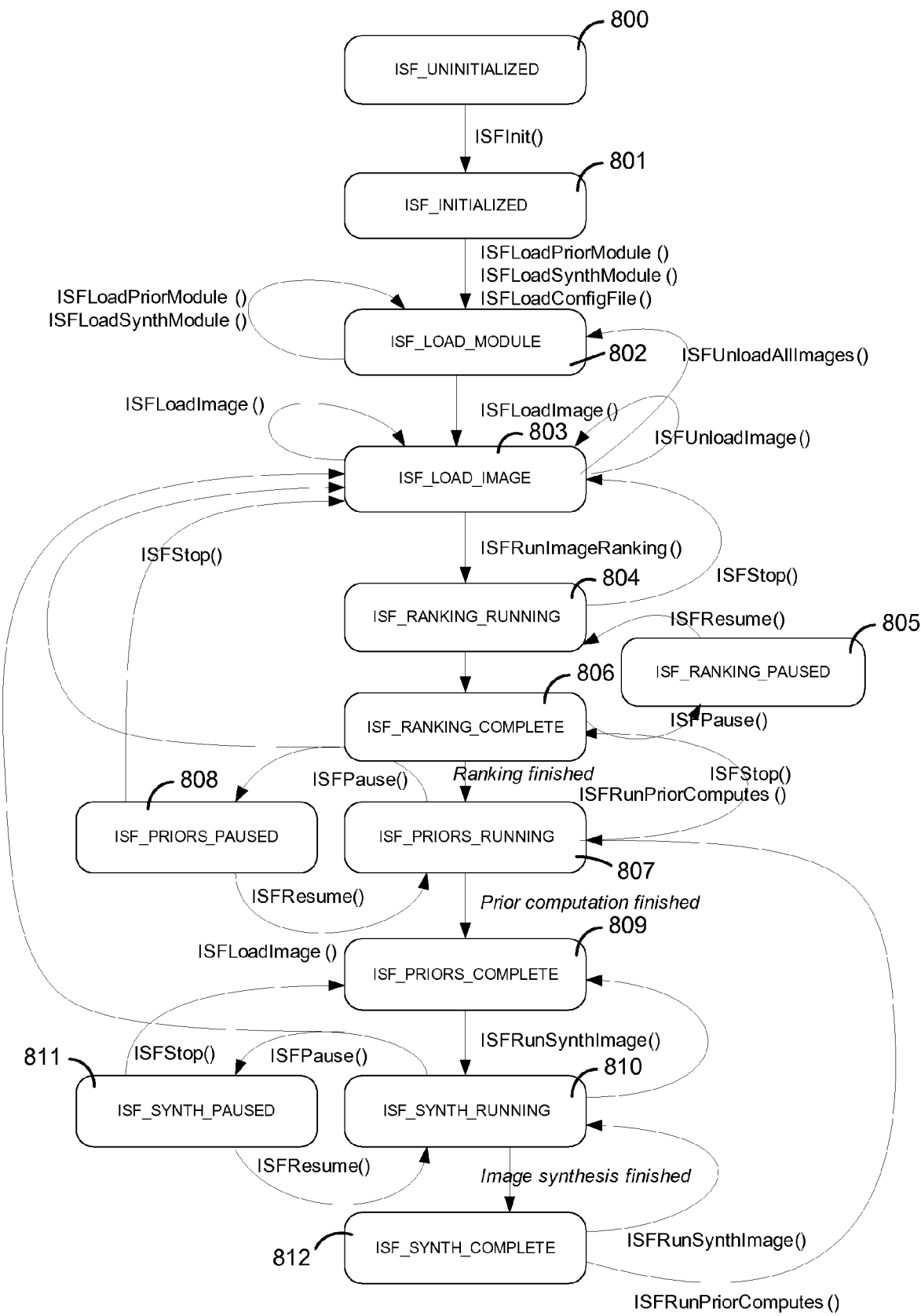
FIG. 8 is a state transition diagram for an image synthesis framework.

FIG. 8 is an example state transition diagram showing the various states of the ISF in one embodiment. Different ones of these states may be used in various combinations and the states may be used in different orders. Also, it may be possible to call ISFDeInit from most states to force the clean up of all allocated resources and force the state back to ISF_UNINITIALIZED. A call to ISFLoadImage in any allowable state is arranged to reset that state to ISF_LOADIMAGE. In this situation, a new image has not yet had any data computed for it such as rank, region of interest or prior compute module results. Resetting the state to ISF_LOADIMAGE enables such data to be computed. Also, in some embodiments, the results of the prior compute modules are cached and reused where possible in order to reduce processing time.

Starting from a state in which the ISF is not yet initialized (box 800) the ISF may become initialized (box 801) and it may then move into a state in which the prior compute and image synthesis modules have been loaded (box 802). The next state occurs when the input images have been loaded (box 803) and following this the state may be that the ranking process is running (box 804) and then complete (box 806). The ranking process may be in a paused state (box 805). When the prior compute modules are running the state is shown in box 807 and this process may be paused (box 808). Once the prior compute process is complete the state is shown in box 809. Next the image synthesis process occurs (box 810) and is then complete (box 812). The image synthesis process may also be paused (box 811).

Figure 9:
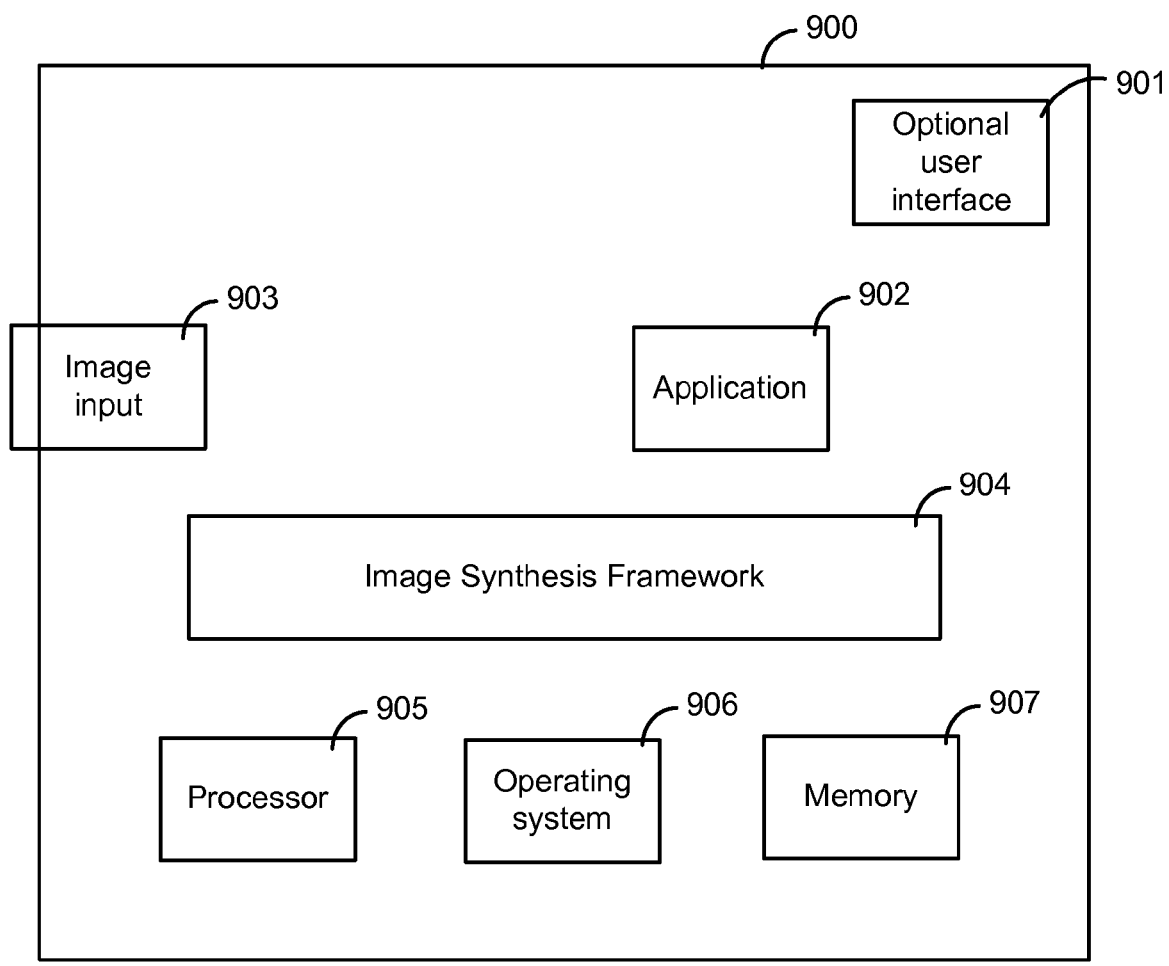
FIG. 9 is a schematic diagram of an apparatus for providing an image synthesis framework and enabling digital collages to be formed.

FIG. 9 is a schematic diagram of an apparatus 900 for providing an ISF 904. The apparatus has an image input 903 arranged to receive the input images. This input is of any suitable type such as a network connection, a USB connection, a disk drive, a user interface or other input. The apparatus comprises a processor 905 which may be provided as a computer or any other suitable type of processor. An operating system 906 is provided to control the processor and apparatus 900 and a memory 907 is present. The image synthesis framework 904 is provided as software or in any other suitable form and may be executed on the processor 905 using the operating system 906 and under the control of a software application 902 of any suitable type. The software application 902 optionally connects to a user interface 901 such as a graphical user interface or other type of user interface.

In some embodiments, to simplify the loading and interfacing to the prior compute and image synthesis modules, use is made of wrapper classes. For example, these classes may derive from a custom wrapper class, for example called a CPlugInWrapper class, which provides support for loading and unloading dll modules, and general support for obtaining procedure addresses of exported dll functions. In an example, further derived classes CPriorComputeWrapper and CImageSynthWrapper provide specific member functions for accessing exported dll functions. The wrapper classes provide an object-oriented wrapper around any of the image synthesis framework, image synthesis module and prior compute module client-side calls For example, each instance of the ISF maintains a vector of CPriorComputeWrapper objects (one for each prior compute module that has been loaded) and a single CImageSynthWrapper object. Each instance of the ISF may also maintain a vector of root image objects which are created when either ISFLoadImage or ISFLoadImageFolder are called. In an example, the root image objects are called CRootImage objects being object-oriented c++ implementations of a root image object.

The prior compute modules each implement a common private API interface to the ISF. For example, the code underlying the prior compute modules is contained within a CPCMain class. Each prior compute module maintains a vector of CPCMain objects. This allows different instances of the ISF to use different and unique instances of the prior compute modules. In this way, state information maintained by each prior compute module may be stored in a prior info structure which is unique to each instance. Each of the different prior compute modules has an associated GUID value. The PCCompute function may store this GUID value in the root image object. This enables the image synthesis module to later determine which potential matrix was created by which prior compute module.

In an example, the functions provided by the prior compute modules private API comprise:

PCInit—an initialization function to initialize a new instance of a prior compute module and return a handle PCDeInit—to deinitialize a prior compute module, clean up and free any allocated resources PcGetPriorInfo—used to obtain the current module information PCFreePriorInfo—used to free the information returned by the PCGetPriorInfo function PCSetPriorInfo—used to set module information. For example, this includes enabling/disabling the module and setting a weighting factor PCCompute—this runs the prior compute process and saves the results in a CRootImage object The image synthesis module implements a common private API interface to the ISF. For example, this comprises functions as follows:

ISInit—to initialize a new image synthesis module instance

ISDeInit—to deinitialize an image synthesis module

ISGetSynthInfo—to obtain the current module information

ISFreeSynthInfo—to free the information returned by the ISGetSynthInfo function

ISSetSynthInfo—to set the specified information

ISSetStatusCallback—to set a callback function

ISPause—to pause the current processing operation

ISResume—to resume the current processing operation following a call to ISPause

ISStop—to terminate the current processing operation

ISSaveSynthImage—to save the synthesized image to a specified file

ISGetSynthImage—to retrieve a copy of the synthesized image

ISFreeSynthImage—to free the image data returned by ISGetSynthImage

ISSynth—perform the synthesis process

ISSetISFStateCallback—used to set the ISF callback function

In a particular example, the region of interest computation, image ranking, some of the prior computation modules and the image synthesis process are as described in our earlier patent application Ser. No. 11/552,312 filed on 24 Oct. 2006. More detail about this is now given. The process of automatically forming the collage is characterized as a labeling problem. Labels in the collage specify which regions of the input images are used to form those collage regions. There are a huge number of possible labelings each corresponding to a different potential collage. Our task is to find an optimal labeling in terms of criteria we specify so that the resulting collage is pleasing, informative and a good summary of the input images. More detail about example labeling systems that may be used are given below.

An energy function is created for the energy of a labeling which contains various terms that are tailored or designed to enable the system to take into account various criteria specified to produce a good collage. More detail about the energy function is given below. The energy function has various parameters or weights that are specified as part of creating the energy function. The parameters or weights influence the degree to which the different criteria are taken into account. Optionally object recognition results for the input images are obtained from one or more prior compute modules and this information is used, either in the energy function itself as part of the parameters or during an optional constraint specification process. One or more constraints on the energy function are specified which may for example, enable computational complexity to be reduced or may act to enable better collages to be produced. More detail about example constraints is given below.

An optimization process is carried out on the energy function taking any specified constraints into account. Any suitable optimization process may be used and examples are given below. The optimization process finds maxima or minima (or local maxima or local minima) of the energy function which are possible labelings. Each possible labeling corresponds to a collage. One or more of these collages are stored or displayed.

Labeling

More detail about the process of specifying the problem is now given. The input to AutoCollage is a set of input images $I=\{I_n, \ldots, I_N\}$. In order to standardize the input, a pre-processing step is assumed to have been applied, so that each image $I_n$ is scaled to have unit area, while preserving the aspect ratios of individual images. As mentioned above, creation of a collage is viewed as a labeling problem, described using the following notation. The collage is itself an image I, defined over a domain P, and each pixel-location $p \in P$ of the collage is to be assigned a label L(p), by the algorithm. The labeling $L=\{L(p), p \in P\}$ completely specifies the collage, as follows. An individual label has the form $L(p)=(n,s)$ in which $I_n \in I$ is the input image from which the collage pixel p is taken, and $s \in S$ is the pixel-wise 2D shift of the input image n with respect to the collage, so that $I(p)=I_n(p-s)$. This is written compactly as $I(p)=S(p,L(p))$, in which $S(\ldots)$ is defined by $S(p,(n,s))=I_n(p-s)$ and normalized as $S(\ldots) \in [0,1] \times [0,1] \times [0,1]$.

The method seeks to find the best labeling $L \in L$, in the space L of possible labelings. This is expressed as finding the labeling L which minimizes an energy or cost E(L), to be defined in detail below. An optimization procedure is defined that searches efficiently in the space of allowed labelings, to obtain a labeling with low energy but, since the algorithm is approximate, not necessarily the global minimum. Note that, by comparison, in earlier work by others, where all input images were pre-aligned, each pixel-label consisted of an image index alone, without any shift variable s. In the present case, the optimization problem is more complex, because it is necessary to search not only over image indices $n=1, \ldots, N$, at each pixel, but also over allowed shifts s.

Collage Energy

The process of creating the energy function for the labeling L is now described in more detail with reference to FIG. 10. This comprises adding together one or more energy terms each of which is designed or tailored to specify criteria or characteristics that are required in order to produce a good labeling (or collage).

In a particular example, the energy function comprises four terms as given below. However, this is not essential. It is also possible to use any one or more of these terms or to use other energy terms as appropriate.

The energy of a labeling L comprises four terms, as follows:

$$E(L)=E_{rep}(L)+w_{imp}E_{imp}(L)+w_{trans}E_{trans}(L)+w_{obj}E_{obj}(L) \quad (1)$$

The first term $E_{rep}$ tends to select the images from the input image set that are most representative, in two senses: first that chosen images are texturally "interesting" and second that they are mutually distinct. For instance this may have the effect that near duplicates will not be selected. The $E_{imp}$ term ensures that a substantial and interesting region of interest (ROI) is selected from each image in I. Next, $E_{trans}$ is a pairwise term which penalizes any transition between images that is not visually appealing. Finally, $E_{obj}$ incorporates information on object recognition, and favors placement of objects in reasonable configurations (faces preserved whole, sky at the top, in our implementation). Below, each of these energy terms is defined in detail, together with constraints that must be maintained.

Examples of the energy term $E_{rep}$ are now given.

Figure 10:
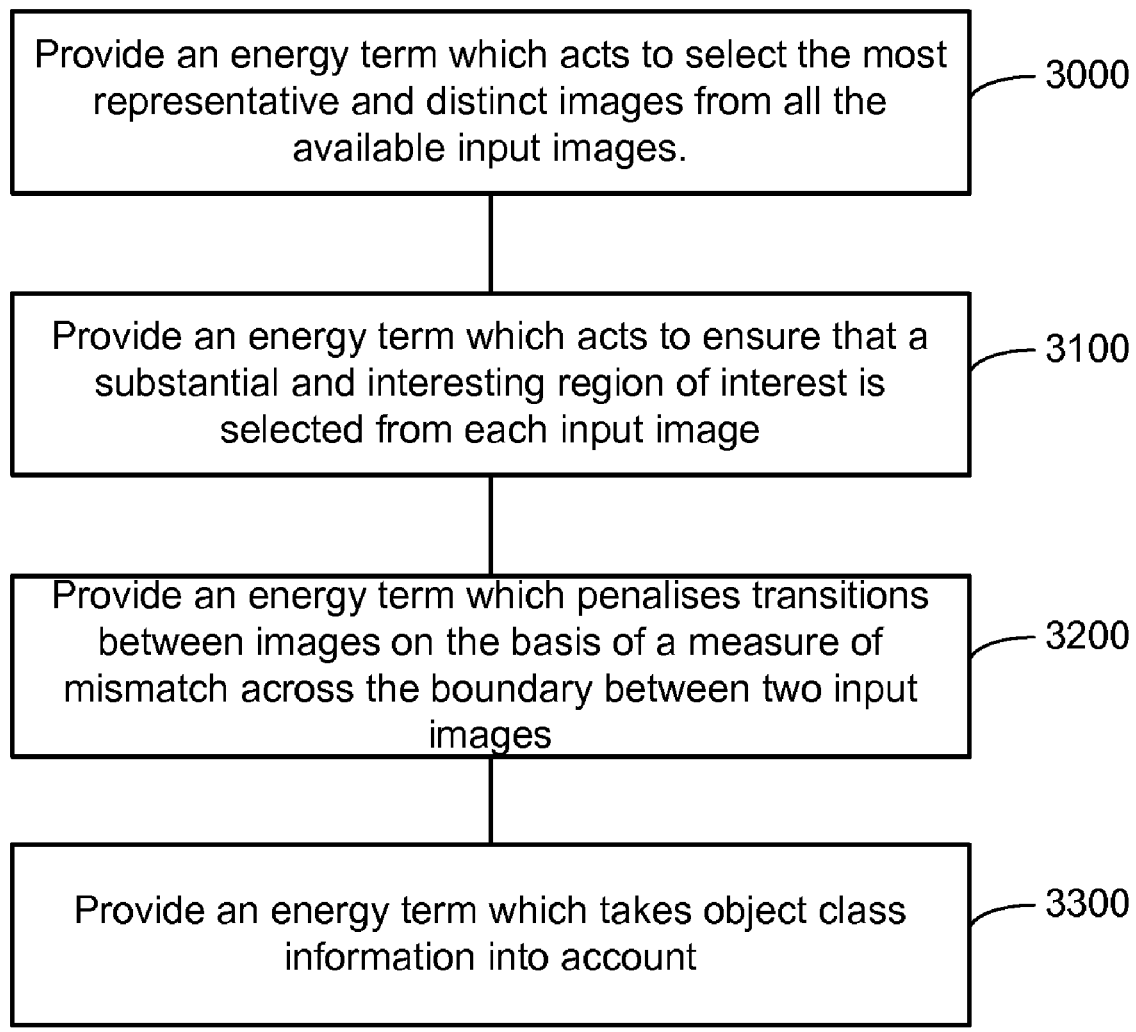
FIG. 10 is a flow diagram of a method of creating an energy function for use in creating a collage.

A first possible energy term acts to select one or more input images from the collection of input images made available (box 3000, FIG. 10). For example, only the most interesting of the input images are selected and not for example, those which are blank or contain little detail. In addition, distinct images are optionally selected.

For example, an energy term is provided which acts to select the most representative and distinct images from the set of available input images (3000, of FIG. 10). For example, the most texturally informative input images from all the available input images are selected. Images may be selected on the basis of a measure of the amount of information in the images. Optionally, selection may be on the basis of information about whether the image contains an image of a particular class of object, such as a face, person, building, car or other specified class of object using information provided by the object recognition system.

In order to reject images which are very similar the system may use any suitable indicator of the similarity of images, such as color histograms, correlation indicators or any other suitable measure. In this way we reduce duplication of material in the collage is reduced.

In a particular example, the cost associated with the set I of chosen images is of the form $E_{rep}=\Sigma_n E_{rep}(n)$ where $$E_{rep}(n) = -a_n D_r(n) - \min_{m|_{m} \in \mathscr{I}} a_n a_m V_r(n, m) \quad (2)$$

and $a_n$ is an auxiliary, indicator variable, taking the value 1 if the image $I_n$ is present in the collage and 0 otherwise:

$a_n=1$ if $\exists p \in \mathscr{P}$ with $L(p)=(n, s)$.

The unary term $D_r(n)$ is a measure of the information in image n. The information measure is defined by $$D_r(n) + \text{Entropy}(I_n) + w_{face}\delta(\{\text{Image } n \text{ contains a face}\}) \quad (3)$$

Where $\delta(\pi)=1$ if predicate $\pi$ is true, and $w_{face}$ weights the influence of an image containing a face, relative to the general textural information in the image. The histogram used to compute entropy for a given image is constructed in two-dimensional a,b space from the L,a,b color system, and discretized into 16×16 bins.

The second term in (2) is expressed in terms of pairwise distances a,b between images, and sums the distances from each image to its nearest neighbor in the set I. As a distance measure $V_r \in [0,1]$ we are using normalized chi-squared distance may be used between the color histograms of a pair of images. The histograms are constructed in a,b space, as above. As well as favoring the most representative images, this energy encourages the use of as many images as possible.

Another possible energy term may be provided which acts to ensure that a substantial and interesting region of interest is selected from each image (box 3100). For example, this energy term takes into account a local entropy measure of a specified region around a pixel in an input image. This local entropy measure is an example of a possible indicator of saliency of the image region. Other saliency indicators may be used instead. For example, the saliency model of Itti, L. Koch, C., and Niebur, E. 1998, "A model of saliency based visual attention for rapid scene analysis. IEEE Trans. on Pattern Analysis and Machine Intelligence 20, 11. Optionally, this energy term is weighted such that the centre of an input image is favored for the region of interest. However, this is not essential. By using this energy term it is possible to reduce the likelihood that small, visually meaningless image fragments will occur in the collage.

This "region of interest" energy term, also referred to as an importance cost energy term is now described in detail for a particular example. The importance cost consists of a unary term of the form:

$$E_{imp}(L) = -\sum_p E_{imp}(p, L(p)) \quad (4)$$

The function $E_{imp}(p,L(p))=G(p,L(p))T(p,L(p))$, where $T(p,L(p))$ measures the local entropy, in ab coordinates, of a (32×32 pixel) region around the pixel p, and normalized so that local entropy sums to 1 over a given input image. The Gaussian weighting function $G(\ldots)$ favors the centre of the input image from which p is drawn.

Another possible energy term penalizes transitions between images on the basis of a measure of mismatch across the boundary between two input images (box 3200). For example, this energy term is also tailored to encourage transitions on a high contrast boundary in either input image. In a particular example, such an energy term is referred to as a transition cost and is described in detail below:

An example transition cost is of the form $E_{trans}=\Sigma_{p,q\in N}V_T(p,q,L(p), L(q))$ where N is the set of all pairs of neighboring (8-neighborhood) pixels. We define the term V as:

$$V_T(p, q, L(p), L(q)) = \min\left(\frac{\|S(q, L(p)) - S(q, L(q))\|}{\varepsilon + \|S(p, L(p)) - S(q, L(p))\|}, \frac{\|S(p, L(p)) - S(p, L(q))\|}{\varepsilon + \|S(p, L(q)) - S(q, L(q))\|}\right) \quad (5)$$

where intensity function $S(\ldots)$ is as defined above, $\varepsilon=0.001$ prevents underflow, and $\|\cdot\|$ defines the Euclidean norm.

In total, $E_{trans}$ measures mismatch across the boundary between two input images. To see this, first observe that $V_T(p,q,L(p), L(q))=0$ unless $L(p)\neq L(q)$. Then note that $V_T(p,q,L(p),L(q))=0$ is small if there is a strong gradient in one of the input images, since the relevant denominator will then be large. The min operation is used because adjacent images in this problem are typically taken from rather different scenes, which often do not match. Our choice of energy then acts appropriately in encouraging transition on a high contrast boundary in either scene, in addition to the usual effect of encouraging a good match across the boundary.

Another possible energy term enables information from an object recognition system (for example a prior compute module) to be taken into account (box 3300, FIG. 10). For example, object classes are identified for one or more objects depicted in the input images and this information is used to influence creation of the collage (see box 3400). In one example, faces are detected and the energy term tailored such that, if a face is included in the collage, it tends to be included as a whole. In another example, if sky regions are detected, these tend to be included only towards the top of the collage.

In one particular example, we have the energy term $E_{obj} = \Sigma_{p,q \in N} f(p,q,L(p), L(q))$, where $f(p,q,L(p), L(q)) = \infty$ whenever $L(p) \neq L(q)$ and p,q are pixels from the same face in either the images of L(p) or L(q), 0 otherwise. For sky rather than defining an explicit energy, we simply label images containing sky and pass this information to a constraint satisfaction engine which attempts to position such images only at the top of the collage.

Parameters are specified for the energy function. These parameters may be specified by hand or may be determined by using an adjustment process together with informal testing of the system. For example, in one embodiment the following parameter values are used although it is noted that these parameter values may be varied substantially whilst still providing workable results. For example, we take $w_{imp} = 10.0$, $w_{trans} = 1.0$, $w_{obj} = 1.0$, $w_{face} = 1$.

Constraints on optimization of the energy function are optionally specified. By specifying constraints in this way we may improve the quality of the collages produced and may also reduce computational complexity.

A first constraint relates to the amount of information contained in the regions of interest relative to the whole image from which that region of interest is taken. For example, this constraint is used to guard against the possibility that only a small and unrecognizable fragment of an input image may be selected and used in the collage. The amount of information (either absolute or relative) contained in a region of interest must be above a specified threshold for example. In a particular example, the region of interest must capture at least 90% of the associated input image information. However, any suitable threshold may be used.

In a particular example of this first constraint, referred to as an information bound constraint, any image $I_n$ that is present in the labeling, i.e. for which L(p)=(n,s) for some s and some p∈P must satisfy $$E_{imp}(L, n) > T, \quad (6)$$

where $E_{imp}(L, n) \in [0.1]$ is the proportion of local image information $\Sigma_p E_{imp}(p, L(p))$, that is captured in the ROI. In an example T=0.9—i.e. so that at least 90% of the image information is captured.

Another optional constraint is referred to herein as a uniform shift constraint. This specifies that a given input image may appear in the collage with only one unique 2D shift (of the input image with respect to the collage). For example, a given input image $I_n$ may appear in the collage with only one unique shift s. i.e. given two distinct pixels p,q∈P: p≠q, with labels L(p)=(n,s),L(q)=(n,s'), it is required that s=s'. This constraint is useful partly for computational efficiency, and partly to ensure that the structure of input images is preserved, without introducing warps.

Another optional constraint is referred to herein as a connectivity constraint. It specifies relative position criteria that collage pixels drawn from the same input image should preferably, but not essentially, meet. For example, each set $S_n \in \{p \in P: L(p) = (n,s), \text{ for some } s\}$ of collage pixels drawn from image n, should form a 4-connected region. This is encouraged during optimization.

Another constraint is that all or a specified proportion of all pixels in the collage must be labeled, i.e. we do not want to have too many unlabelled pixels since these would give us a blank region in the collage which is visually not appealing.

Figure 11:
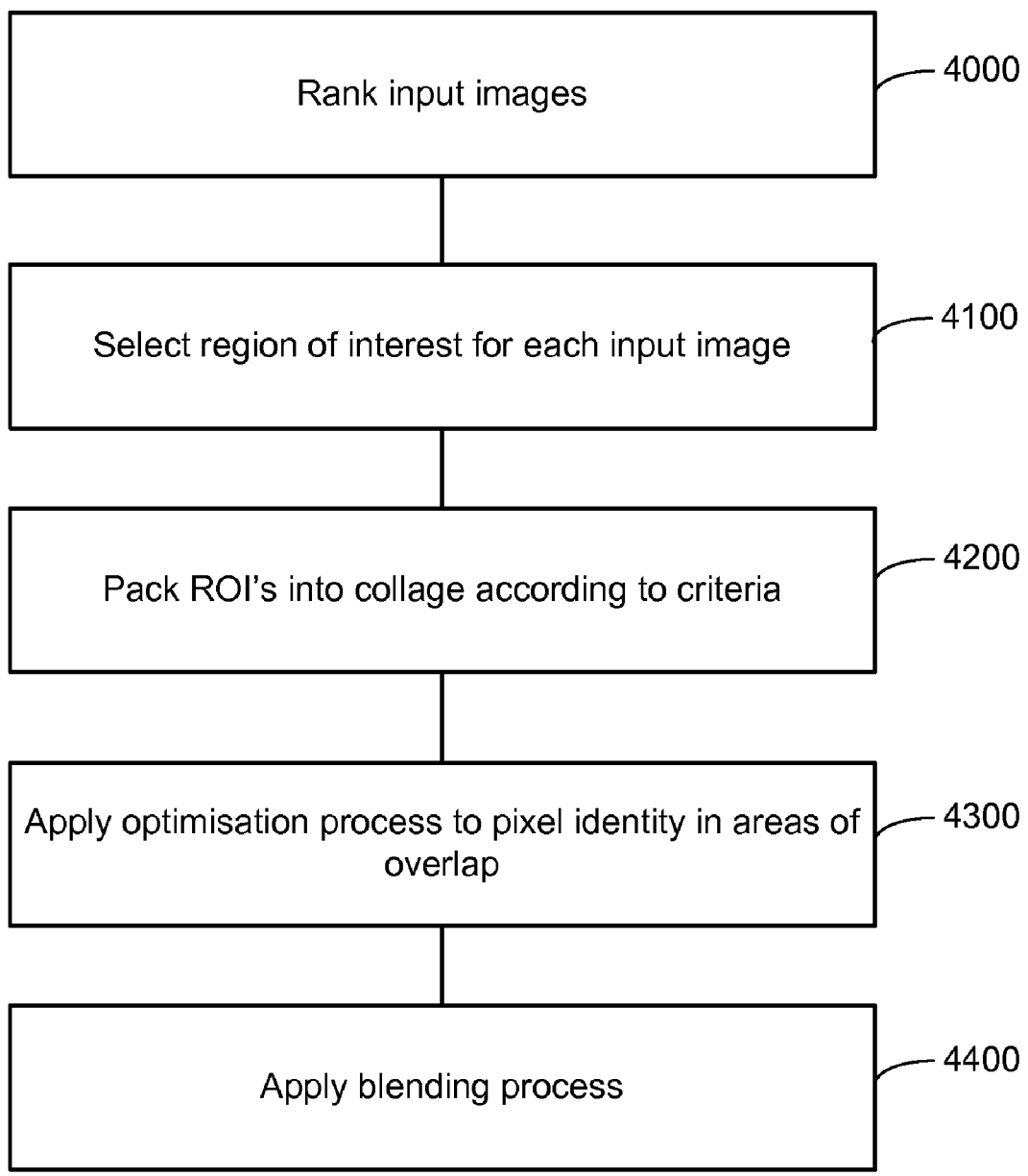
FIG. 11 is a flow diagram of an optimization process.

An optimization process is carried out on the energy function, taking any specified constraints into account. In one embodiment a single stage graph-cut optimization process is used as described in our earlier patent documents referenced above. In another group of embodiments a heuristic approach is used in which the various aspects of the labeling are optimized independently or in separate optimization stages (either in parallel or in series as discussed in more detail below). By using a multi-stage optimization process in this way we are able to tackle computational complexity and to provide a system that is fast and scalable for large input image sets, such as 50 or more input images. FIG. 11 illustrates four optimization stages according to one example.

The input images are ranked statically during a ranking process 4000 on the basis of how much information they contain and rejecting near duplicates. This is done using the energy term described with reference to box 3000 of FIG. 10 also referred to as the $E_{rep}$ energy term. Regions of interest are selected for each input image (box 4100) and minimized according to specified constraints. For example, the regions of interest are rectangular (where rectangular includes squares) or of any other specified shape. The constraints may be for example the information bound constraint mentioned above and the requirement that all detected faces be included. By using an explicit region of interest selection process we are able to produce good quality collages even where the input images are very different in terms of textural and information content. The steps of ranking the input images and of selecting the regions of interest may be carried out in series or in parallel.

A packing problem is then solved (box 4200) to assemble and position as many images with highest rank, into the area allowed for the collage, without allowing regions of interest to overlap. Also, no pixels in the collage should be left blank although this requirement is not mandatory. An optimization process (box 4300) is then used to fix pixel identity in the collage in areas of overlap of two or more images. Any suitable optimization process may be used such as a graph-cut optimization as described below. Other examples of suitable optimization processes include but are not limited to: belief propagation, simulated annealing, ICM and TRW.

Each of these four optimization steps is now described in more detail with reference to a particular example.

Image ranking. The ranking step, in the sequence of optimizations, addresses the $E_{rep}$ term in the collage energy (1). First ranks images $I_n$ are relabeled, so that the index n ranks them according to how representative the subset $I_1, \ldots, I_n$ is. This is straightforward since $E_{rep}(n)$ is simply a static rank computed independently in terms of the $n^{th}$ image and its predecessors of higher rank. Thus the $n^{th}$ image is selected greedily as the one that minimizes $$-a_n D_r(n) - \min_{m<n} a_n a_m V_r(n, m),$$

adapting the term $E_{rep}(n)$ (2). The resulting ranking is then passed to the constraint satisfaction step below.

Region of Interest (ROI) optimization. The ROI for each input image $I_n$ is fixed by minimizing, independently for each image, the area of the ROI subject to meeting the information-bound constraint (6), and the constraint that all detected faces are included. This is achieved by constructing a summed area table such as described in Crow, F. 1984 "Summoned area tables for texture mapping", in Proc. ACM Siggraph, ACM, 207-212, for rapid lookup of the total information $\Sigma_{p \in R} E_{imp}(p, L(p))$ in any rectangular ROI R . All rectangles are then enumerated, and checked for satisfaction of the constraint, in order to select the one with minimum area. This operation is quadratic in the number of pixels in $I_n$, and this is mitigated by subsampling. This is done under the constraint that all detected faces are included.

Constraint satisfaction. Here, the packing sub-problem can be stated as follows. We are given a set of selected images and their ROIs, together with the ranking computed above. The goal is to incorporate as many highly ranked images as possible within the width and height of the collage, while respecting the additional constraint that every pixel be covered by some image (though not necessarily covered by some ROI).

This packing problem is unusual because of the simultaneous presence of constraints for nonoverlapping—no two ROIs should intersect—and covering—every pixel is covered by an image, though not necessarily by a ROI. The general approach is to model the problem as a set of constraints (inequalities, Boolean and linear expressions) between a set of variables, then to solve these constraints by applying constraint satisfaction techniques. One way to model the problem using constraints is now described (several variants can alternatively be considered). In this problem, the set of variables is $$\mathcal{V} = \{(x_n, y_n, b_n), n=1, \ldots, N\}, \quad (7)$$

the positions $(x_n, y_n)$ for each images and a boolean flag $b_n$ indicating whether the image is to be included or not.

To express the fact that ROIs do not intersect (nonoverlapping), constraints are applied pairwise to images; a typical constraint would be:

if $b_n$ and $b_m$ then $\pi_1$ or $\pi_2, \ldots,$ (b)

where a typical proposition is $\pi_1 = (x_n - x_m > w_m + w_n)$, in which $w_m$ and $w_n$ are respectively the half-widths of the ROIs. Because the relative positions of a ROI pair may be switched, these constraints appear in disjunctive sets. To express the fact that every pixel of the collage fall under the surface of at least one image (covering), constraints are imposed on every pixel; a typical constraint would be:

$$|i - x_n| \leq W_n \wedge |j - y_n| \leq H_n$$

In which $W_n$ and $H_n$ are respectively the half-width and half-height of image n. This constraint imposes that pixel (i, j) be covered by the $n^{th}$ image. For example, disjunction of such constraints is imposed for every pixel, modeling the requirement that each of them is covered by (at least) one of the images. Further object-sensitive constraints can be included—for instance we may insist that images with sky appear only at the top of the collage.

Problems involving Boolean combinations of constraints are amenable to approaches based on constraint programming (CP). For example, to obtain good solutions efficiently, we use a two-step approach now described: the first step (branch and bound) solves the problem by only taking into account the constraints of non-overlapping on the ROIs; then the second step (local search) corrects the solution in order to respect the covering constraints.

1. Branch and bound The framework for the first optimization step is a depth-first search which aims at maximizing the number of selected images and their quality (Eq. (2)). Constraint propagation as described in Waltz, D, 1975 "Understanding line drawings of scenes with shadows", in the Psychology of Vision, W.P.H., Ed McGraw-Hill, New York, is applied to subtrees, from which the subtree may either be pruned, or have its search space reduced. Real variables (xn,yn) are dealt with by coarse discretization with conservative truncation of constraints. The issue of switching the set of active constraints from propagation is dealt with by reification as defined in Marriott, K and Stuckey, P, 1998, "Programming with Constraints", The MIT Press. In the branch and bound step, no account is taken of the covering requirement. At this stage the problem of packing as many rectangles as possible is solved, within the disjunctive constraints on overlap of ROIs. Even with coarse discretization, the branching factor at a node is large. This is dealt with by randomly selecting a limited number of branches to explore, and by allowing, for each of them, a bounded number of backtracking steps.

2. Local search Once branch and bound has terminated, the resulting packing satisfies the non-overlap constraints between ROIs, but in general will not satisfy the covering constraint. At this point, a local search is applied in order to repair the solution. Perturbations are applied only to $(x_n, y_n)$, not to $b_n$, so the set of selected images is fixed during this step. The effect of this step is to move the images whenever this move increases the coverage, which can be done by any deterministic or randomized local search algorithm.

To make sure that a solution which satisfies both the non-overlapping and covering constraints is systematically found, we repeat steps 1) and 2) several times if necessary, and each time relax slightly the constraints (propositions $\pi_i$ in Eq. 8). The constraint satisfaction step can generate multiple solutions. After refinement in step 2, these multiple solutions can be evaluated using a bound on the energy function (Eq. 1) or given directly to graph cut optimization. (A bound is needed because strictly the energy function itself is only defined for single coverings of pixels, not multiple coverings as delivered by constraint satisfaction.)

Graph cut with alpha expansion. Graph cut optimization need be applied only to the image variable n in each pixel-label L(p) since the shift s for each image is now fixed. In practice, up to four values of n need to be considered at each p so alpha-expansion is used as defined in Boykov, Y Veksler, O and Zabih, R, 2001 "Fast approximate energy minimization via graph cuts", IEEE Trans on Pattern Analysis and Machine Intelligence 23, 11. Here the objective function to be minimized is that part of the energy E in (1) that is still "in play", namely $w_{imp} E_{imp}(L) + w_{trans} E_{trans}(L) + w_{obj} E_{obj}(L)$. The first of these terms is unary and the second and third are binary. Since this energy can be shown to be non-metric, the truncated schema of alpha-expansion is used, as explained in our earlier patent documents referenced above. At each iteration of alpha-expansion, the 4-connectedness property is encouraged by dilating the optimally expanded set by one pixel.

As illustrated in of FIG. 11 a blending process 4400 is carried out to create a seamless transition between input images that are adjacent in the collage. Any suitable image blending process can be used. An option is to use Poisson blending such as described in Perez, P., Gagnet, M., and Blake, A. 2003 "Poisson image editing." ACM Trans. Graph. 22, 3, 313-318 or an extension of Poisson blending including edge-sensitivity as described in Agarwala, A. et. al. 2004 "Interactive digital photomontage". ACM Trans. Graph. 23, 3, 294-302.

In one embodiment we use an edge-sensitive blending in an α channel rather than in image color channels. This is done by computing an alpha mask for each individual input image. In a first step, for a particular image $I_k$ an overlap area is computed which comprises of all pixels p where the set of labels L(p), which is the same as for the preceding graph-cut optimization, includes label $I_k$ and at least one other label. Then the following functional minimizes over the overlap area $$F(\alpha)=\int ||u(r)-\alpha(r)||^2+w(r)||\nabla\alpha||^2 dr; \quad (9)$$

where $$w(r) = \lambda + \beta\exp-\frac{1}{2g^2}\max_n ||\nabla I_n||$$

is taken over the images $I_n$ present in the overlap. Normalizing constant $g^2$ is a mean-square gradient, and we set $\lambda=20$, $\beta=10$. The function u(r) takes the value 1 at a pixel p if the image label, given by graph-cut, is $I_k$ and 0 otherwise. This selection then biases α towards the graph-cut solution. Maximization of the functional F is subject to boundary conditions that α=0,1 over the overlap area, and is computed by solving a Poisson equation. In a final step each image alpha mask is normalized so that at each pixel p in the output domain the sum of all defined alpha masks is one. As a result, both sharp abutments and transparent blends are achieved automatically in a collage.

Using this edge-sensitive blending process in the α channel seams are created between input images which switch automatically between cutting along natural boundaries or blending transparently, according to the presence or absence of underlying sharp edges.

In other embodiments it is possible to take user input preference information into account. For example, a user interface is provided that enables the user to specify specific constraints such as selecting particular images to be used for creating the collage. These user specified constraints are then taken into account during the optimization process. In addition, the user interface may allow the user to move, re-size and swap input images and to select specific image parts for inclusion in the collage.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An image processing system comprising:
   one or more processors coupled to one or more memories;
   an input arranged to receive a plurality of digital images for automatically forming a digital collage;
   a first module implemented by the one or more processors, providing an application programming interface arranged to be used by an application in order to control the image processing system, said first module being configured to modify dimensions of the received images so that each of the images matches a normalized dimension requirement;
   a plurality of prior compute modules, implemented by the one or more processors each having an interface to the first module, and each arranged to compute information to be used in determining rank and identifying regions of interest in the plurality of images; and
   an image synthesis module, having an interface to the first module, implemented by the one or more processors, and arranged to automatically form the digital collage from at least some of the plurality of digital images on the basis of the information computed by the prior compute modules.

2. An image processing system as claimed in claim 1 wherein the prior compute modules are given weights that are adjustable by a user of the application for controlling importance of corresponding information computed by the prior computer modules for determining rank and regions of interest of the images.

3. An image processing system as claimed in claim 1 wherein the first module is arranged to rank the received digital images on a basis of how much information each image contains and rejecting near duplicates.

4. An image processing system as claimed in claim 1 wherein the output of each prior compute module comprises a potential matrix, being a two dimensional array of values, each value being associated with an image block.

5. An image processing system as claimed in claim 4 wherein one of the prior compute modules is arranged to produce a potential matrix comprising weights according to a Gaussian distribution.

6. An image processing system as claimed in claim 4 wherein one of the prior compute modules is arranged to produce, for a given image, a saliency potential matrix comprising contrast values calculated from that image.

7. An image processing system as claimed in claim 4 wherein one of the prior compute modules is arranged to produce, for a given image, a face potential matrix comprising information about faces detected in that image.

8. An image processing system as claimed in claim 1 wherein the first module is also arranged to determine a region of interest for each of the plurality of digital images based on the information computed by one or more of the prior compute modules.

9. An image processing system as claimed in claim 1 wherein the application programming interface comprises a function to enable a particular received image's calculated region of interest to be modified.

10. An image processing system as claimed in claim 1 wherein the application programming interface comprises a function to enable a rank of a received image determined by the first module to be over-ridden.

11. An image processing system as claimed in claim 8 wherein an amount of information contained in the region of interest must be above a specified threshold relative to the total amount of information contained in the image.

12. An image processing system as claimed in claim 8 wherein, when a face is identified as a region of interest, the face is included as a whole in the region of interest.

13. An image processing system as claimed in claim 8 wherein the image synthesis module applies an optimization process to pack as many of the regions of interest as possible into a predetermined width and height of the digital collage, wherein as many collage pixels as possible are covered by some input image without overlapping of the regions of interest.

14. An image processing system as claimed in claim 1 further comprising an application arranged to control the image processing system, that application being arranged to display a user interface at a display, the user interface comprising items to control selection of prior compute modules and selection of relative weights to be used in association with results of the selected prior compute modules.

15. A method of image processing comprising the steps of:
receiving, by a first module implemented by one or more processors, a plurality of digital images for inclusion in a digital collage;
providing at the first module at least an application programming interface implemented by the one or more processors and arranged to be used by an application in order to control the image processing method;
using a plurality of prior compute modules, implemented by the one or more processors, each prior computer module having an interface to the first module, to compute information to be used in determining a rank and a region of interest for each of the images; and
using an image synthesis module, implemented by the one or more processors and having an interface to the first module, to automatically form the digital collage from at least some of the plurality of digital images on the basis of the information computed by the prior compute modules by positioning as many images with highest rank into an area specified for the digital collage without allowing the regions of interest to overlap and while covering as many pixels of the area as possible.

16. A method as claimed in claim 15 which comprises using the first module to modify the dimensions of the received digital images so that each of the images matches a normalized dimension requirement.

17. A method as claimed in claim 15 which comprises using the first module to rank the received digital images on the basis of at least one metric using the information computed by one or more of the prior compute modules.

18. A method as claimed in claim 15 which comprises using each prior compute module to produce a potential matrix, being a two dimensional array of values, each value being associated with an image block.

19. A method as claimed in claim 18 further comprising giving weighting values to the prior compute modules that are adjustable by a user of the application for controlling importance of corresponding information computed by the prior computer modules for determining rank and regions of interest of the images.

20. A method of image processing comprising:
receiving, by a first module implemented by one or more processors, a plurality of digital images for use in automatically forming a digital collage;
providing an application programming interface, implemented by the one or more processors, arranged to be used by an application in order to control the image processing method;
modifying, by a second module implemented by the one or more processors, dimensions of the received digital images so that each of the images matches a normalized dimension requirement of a uniform size;
ranking, by a third module implemented by the one or more processors, the images relative to each other on a basis of how much information is contained in each image and rejecting near duplicates;
computing, by a fourth module implemented by the one or more processors, a region of interest for each received image according to specified constraints;
positioning, by a fifth module implemented by the one or more processors, as many images with highest rank into an area specified for the digital collage without allowing the regions of interest to overlap and while covering as many pixels of the area as possible; and
blending, by a sixth module implemented by the one or more processors, adjacent images positioned in the area using an edge-sensitive blending process whereby seams are created between the images that switch automatically between cutting along natural boundaries and blending transparently according to the presence or absence, respectively, of underlying sharp edges.

* * * * *